US008060410B2

(12) United States Patent
Hahn-Carlson

(10) Patent No.: US 8,060,410 B2
(45) Date of Patent: *Nov. 15, 2011

(54) AUTOMATED TRANSACTION PROCESSING SYSTEM AND APPROACH

(75) Inventor: Dean W. Hahn-Carlson, St. Paul, MN (US)

(73) Assignee: Syncada LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,792

(22) Filed: Nov. 10, 2009

(65) Prior Publication Data
US 2010/0057595 A1     Mar. 4, 2010

Related U.S. Application Data

(63) Continuation of application No. 10/939,097, filed on Sep. 10, 2004, now Pat. No. 7,627,499, which is a continuation of application No. 09/527,717, filed on Mar. 17, 2000, which is a continuation-in-part of application No. 09/522,745, filed on Mar. 10, 2000, now Pat. No. 6,697,702, which is a continuation-in-part of application No. 09/259,657, filed on Feb. 26, 1999, now Pat. No. 6,571,149, which is a continuation of application No. 08/748,243, filed on Nov. 12, 1996, now Pat. No. 5,910,896.

(60) Provisional application No. 60/124,124, filed on Mar. 12, 1999.

(51) Int. Cl.
*G06Q 30/00* (2006.01)

(52) U.S. Cl. .......... 705/26; 705/1; 705/64; 705/67; 705/75

(58) Field of Classification Search .......... 705/26, 705/1, 64, 67, 75
See application file for complete search history.

(56) References Cited

U.S. PATENT DOCUMENTS

| | | | |
|---|---|---|---|
| 4,114,027 A | 9/1978 | Slater et al. | |
| 4,270,042 A | 5/1981 | Case | |
| 4,305,059 A | 12/1981 | Benton | |
| 4,412,287 A | 10/1983 | Braddock, III | |
| 4,567,359 A | 1/1986 | Lockwood | |
| 4,713,761 A | 12/1987 | Sharpe et al. | |

(Continued)

OTHER PUBLICATIONS

U.S. Appl. No. 09/527,717, filed Mar. 17, 2000, Hahn-Carlson.

*Primary Examiner* — Pierre E Elisca
(74) *Attorney, Agent, or Firm* — Crawford Maunu PLLC

(57) ABSTRACT

Transaction management is facilitated using an approach involving the use of transaction characteristics to authenticate transaction information. According to an example embodiment, a computer processing system is programmed to process a shipment transaction involving a shipper and a carrier. The system is particularly suited to efficiently automate the payment of a shipment transaction and to efficiently provide access to relevant shipment information. The system includes a shipper processor that receives transaction document information such as purchase order information and assists in generating a bill of lading for the transaction. A shipper access terminal interfaces between the shipper processor and a central processor arrangement to control the quantity, quality, and timeliness of information transferred to the central processor arrangement. The central processor arrangement stores selective transaction information such as shipment information and generates reports regarding the transactions, with each transaction having particular information associated with it (e.g., shipper ID, carrier ID and other information). A carrier processor provides proof of delivery to the central processor arrangement. The central processor communicates with one or more financial institutions so that the carrier is paid and shipper billed for the relevant transaction.

14 Claims, 9 Drawing Sheets

U.S. PATENT DOCUMENTS

| | | | |
|---|---|---|---|
| 4,725,719 | A | 2/1988 | Oncken et al. |
| 4,750,119 | A | 6/1988 | Cohen et al. |
| 4,799,156 | A | 1/1989 | Shavit et al. |
| 4,926,325 | A | 5/1990 | Benton et al. |
| 4,949,272 | A | 8/1990 | Vanourek et al. |
| 4,960,981 | A | 10/1990 | Benton et al. |
| 5,008,827 | A | 4/1991 | Sansone et al. |
| 5,025,372 | A | 6/1991 | Burton et al. |
| 5,040,132 | A | 8/1991 | Schuricht et al. |
| 5,043,908 | A | 8/1991 | Manduley et al. |
| 5,077,694 | A | 12/1991 | Sansone et al. |
| 5,117,364 | A | 5/1992 | Barns-Slavin et al. |
| 5,153,842 | A | 10/1992 | Dlugos, Sr. et al. |
| 5,161,109 | A | 11/1992 | Keating et al. |
| 5,168,444 | A | 12/1992 | Cukor et al. |
| 5,175,416 | A | 12/1992 | Mansvelt et al. |
| 5,208,446 | A | 5/1993 | Martinez |
| 5,218,188 | A | 6/1993 | Hanson |
| 5,220,501 | A | 6/1993 | Lawlor et al. |
| 5,222,018 | A | 6/1993 | Sharpe et al. |
| 5,231,569 | A | 7/1993 | Myatt et al. |
| 5,285,383 | A | 2/1994 | Lindsey et al. |
| 5,293,310 | A | 3/1994 | Carroll et al. |
| 5,334,823 | A | 8/1994 | Noblett, Jr. et al. |
| 5,334,824 | A | 8/1994 | Martinez |
| 5,337,246 | A | 8/1994 | Carroll et al. |
| 5,357,563 | A | 10/1994 | Hamilton et al. |
| 5,393,963 | A | 2/1995 | Thomas et al. |
| 5,426,281 | A | 6/1995 | Abecassis |
| 5,440,634 | A | 8/1995 | Jones et al. |
| 5,485,369 | A | 1/1996 | Nicholls et al. |
| 5,631,821 | A | 5/1997 | Muso et al. |
| 5,631,827 | A | 5/1997 | Nicholls et al. |
| 5,666,493 | A | 9/1997 | Wojcik et al. |
| 5,717,989 | A | 2/1998 | Tozzoli et al. |
| 5,732,400 | A | 3/1998 | Mandler |
| 5,770,844 | A * | 6/1998 | Henn ............... 235/380 |
| 5,794,207 | A | 8/1998 | Walker et al. |
| 5,842,178 | A | 11/1998 | Giovannoli |
| 5,896,530 | A * | 4/1999 | White ............... 718/102 |
| 5,910,896 | A | 6/1999 | Hahn-Carlson |
| 5,924,082 | A | 7/1999 | Silverman et al. |
| 5,930,363 | A | 7/1999 | Stanford et al. |
| 5,982,891 | A | 11/1999 | Ginter et al. |
| 5,995,976 | A | 11/1999 | Walker et al. |
| 6,026,374 | A | 2/2000 | Chess |
| 6,029,150 | A | 2/2000 | Kravitz |
| 6,047,268 | A | 4/2000 | Bartoli et al. |
| 6,151,588 | A | 11/2000 | Tozzoli et al. |
| 6,266,640 | B1 | 7/2001 | Fromm et al. |
| 6,323,894 | B1 | 11/2001 | Katz |
| 6,571,149 | B1 | 5/2003 | Hahn-Carlson |
| 6,697,702 | B1 | 2/2004 | Hahn-Carlson |
| 7,076,652 | B2 | 7/2006 | Ginter |
| 7,327,952 | B2 | 2/2008 | Enomoto |
| 7,627,499 | B2 | 12/2009 | Hahn-Carlson |
| 2004/0184163 | A1 | 9/2004 | Nishioka et al. |
| 2004/0201074 | A1 | 10/2004 | Khandros et al. |

\* cited by examiner

AUTOMATED TRANSACTION PROCESSING SYSTEM AND APPROACH

RELATED PATENT DOCUMENTS

This is a continuation of U.S. patent application Ser. No. 10/939,097 filed on Sep. 10, 2004, now U.S. Pat. No. 7,627, 499 which is a continuation of U.S. patent application Ser. No. 09/527,717 filed on Mar. 17, 2000; U.S. patent application Ser. No. 09/527,717 is further a continuation-in-part of U.S. patent application Ser. No. 09/522,745 filed on Mar. 10, 2000 (U.S. Pat. No. 6,697,702), which claims benefit of U.S. Provisional Patent Application Ser. No. 60/124,124 filed on Mar. 12, 1999; U.S. patent application Ser. No. 09/522,745 is further a continuation-in-part of U.S. patent application Ser. No. 09/259,657 filed on Feb. 26, 1999 (U.S. Pat. No. 6,571, 149); which is continuation of U.S. patent application Ser. No. 08/748,243 filed on Nov. 12, 1996 (U.S. Pat. No. 5,910, 896); each of these patent documents is fully incorporated herein by reference.

FIELD OF THE INVENTION

The present invention relates to a system and approach for business transactions involving at least two parties to the transaction.

BACKGROUND

Processing business transactions such as shipment transactions between parties has been a manually intensive effort and has experienced little change. For example, shipment transaction processes involve a goods transport path and a payment process path. The goods transport path typically starts when a carrier picks up the goods at the shipper's warehouse dock. The carrier receives a copy of a transaction document, for example a bill of lading (BOL), from the shipper. This type of transaction document includes information associated with the shipment transaction that is used by the shipper and carrier to track the shipment of goods. The carrier transports the goods to the receiver where the receiver signs a copy of the BOL to verify receipt of the goods. After the carrier has delivered the goods to the receiver, the carrier also submits the receiver's signed copy of the BOL to the carrier's headquarters.

The payment process path starts when the carrier picks up the goods from the shipper. The carrier sends a copy of the BOL to the carrier's headquarters for processing. The carrier headquarters rates the BOL. Rating involves determining the shipment cost which takes into the account various shipment parameters such as the size, weight, type of material, and destination of the shipment. The carrier creates an invoice, sets up an accounts receivable, and sends the invoice to the shipper's accounts payable department. The shipper, either internally or via a third party, audits the invoice to ensure the final cost is proper.

One of the more burdensome aspects of traditional transaction processes involves reaching agreement as to the final cost. If there is a dispute as to final cost, the parties to the transaction begin a burdensome and sometimes lengthy negotiation process in an attempt to settle the dispute. For example, if the dispute is resolved in a transaction involving shippers and carriers, the shipper sets up an accounts payable for the transaction. The shipper will then send payment to the carrier and clear the accounts payable. Traditionally, the process for paying the carrier and clearing the accounts payable involves several manually intensive steps. Upon receipt of payment, the carrier clears the accounts receivable. Traditionally, the process for clearing an accounts receivable includes the carrier manually inputting final payment information into the accounts receivable system.

The traditional approach can lead to many disadvantages for a transaction between one party and another party. Typically, however, there are multiple parties involved in multiple transactions, which makes the situation more complex, and that much more slow and inefficient. The process is manually intensive in that it relies on the hard copy of transaction documents (e.g., purchase orders, invoices and/or a BOL for proof of delivery and payment), resulting in a series of repetitive and time consuming steps. Also, in the instance where a BOL is used, each BOL is often rated multiple times by multiple parties creating excessive redundancy. Similarly, other transaction documents are also often kept on file at multiple locations, which also creates redundancy.

Traditional transaction systems are also highly susceptible to billing errors and fraud. For example, there is no connection between the delivery of goods and when the shipper is billed for delivery in shipping-type transaction systems. This may result in double billing, no billing at all, or overbilling the shipper for freight delivery charges. Also, an auditing error may occur that results in incorrect billing or payment. In addition, the carrier waits a disproportionately long time for payment while the invoice is being audited and/or disputed. For example, traditionally, a delivery takes about five days whereas payment takes about thirty days. This unnecessary delay adversely affects the carrier's working capital resources.

Additional costs arise as a result of existing inefficiencies in a variety of transaction processing approaches. Many of the costs are individually small, but very large in the aggregate. For example, typical parties to transactions incur administrative costs such as those relating to the cost to create and deliver the initial invoice, costs of resolving billing disputes, costs of providing a signed copy of the BOL to the shipper, and costs of posting accounts receivable. In addition, the cost of parsing, recognizing and categorizing documents related to these and other items add to the administrative costs of transactions.

An additional challenge to transaction management involves the inability to obtain immediate information regarding a shipment. Since the process is largely conducted manually, it is very difficult to track a shipment. To learn of the status of a shipment or payment, there are various manual steps involved. For example, if the shipper wants to know if the carrier delivered the goods and if the payment has been made, the shipper must call the carrier and the appropriate financial institution. Shipping-related information such as BOL-type documents and others is typically not readily available to other parties to the transaction without direct access to shipper-attributed systems.

There have been numerous attempts to improve existing transaction management approaches, such as existing shipment and payment processes. Some improvements have been made, for instance, to each separate step of completing a shipment transaction, but the entire method remains relatively unchanged. For example, freight agents are used by shippers to schedule shipments and to process the invoice from the carrier. Also, third party service providers have taken over the role of managing the shipper's accounts payable department.

Another attempt to improve this burdensome transaction process involves the use of the Internet. Carriers have offered Internet access to their shipment information. Shippers access the carrier's Internet address and find out the immediate status of the shipment. A disadvantage of this system arises when, as in many applications, the shipper is using multiple carriers. In this typical situation, the shipper separately accesses the address of each carrier in order to find out the status of each shipment. This is unduly time consuming.

Another disadvantage of traditional systems is that reference numbers used by different parties to identify a particular transaction are not compatible. For example, carriers maintain shipment data organized by reference numbers generated by the carrier, so shippers typically must access the data using the carrier's reference number rather than the shipper's reference number. The shipper and carrier track each shipment using multiple reference numbers.

The above and other difficulties in the management and coordination of business transactions have presented challenges to the effective and efficient management thereof.

SUMMARY OF THE INVENTION

The present invention is directed to overcoming the above-mentioned challenges and others related to the types of approaches and implementations discussed above and in other applications. The present invention is exemplified in a number of implementations and applications, some of which are summarized below.

According to one application, the present invention is directed to a transaction approach for processing transaction information such as information related to goods shipped from a shipper by a carrier or information related to other transactions between parties. The system comprises a means for accepting transaction information at a first party's premises. The system provides a data processing means at the first party's premises, responsive to the transaction information, arranged and configured to generate a set of transaction information. The set of transaction information includes information associated with a second party to the transaction and, e.g., other information such as the time at which the transaction is initiated at the first party's premises. The system uses a central processor arrangement, responsive to the transaction information, and located remote from the shipper's premises, for processing selective information regarding the transaction. The system provides means for informing the central processor arrangement of actions by parties to the transaction, such as delivery of goods by a carrier. The central processor arrangement, responsive to informing means, uses the transaction information to audit the transaction, e.g., payment thereof.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIG. 2*a* is a block diagram illustrating an example flowchart for programming the BOL rating engine 30 of FIG. 1 according to the present invention;

Figure 1:
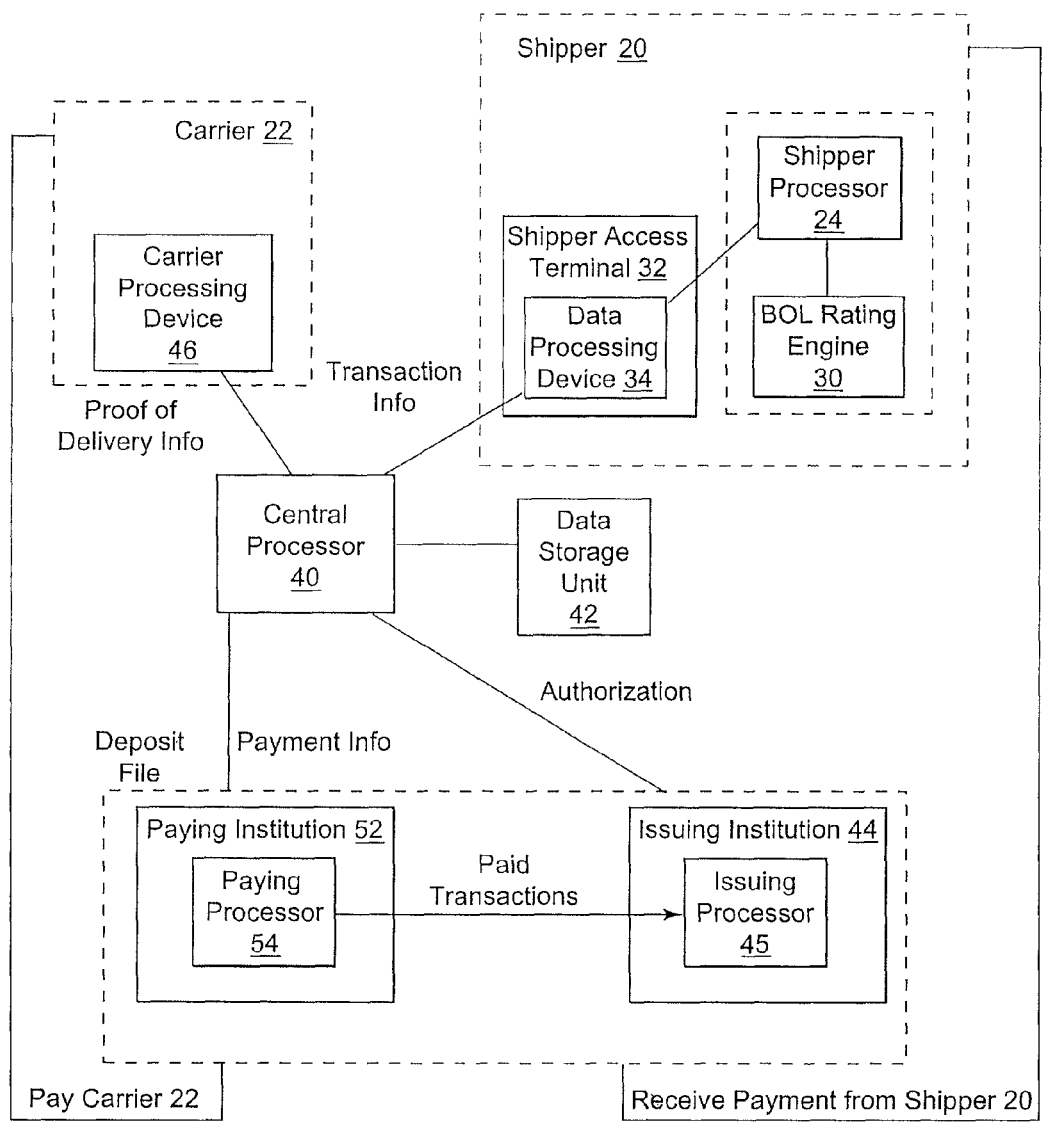
FIG. 1 is a block diagram illustrating a specific embodiment that incorporates principles of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of business approaches and interactions, and has been found to be particularly useful for applications involving the processing of business transactions and related aspects thereof. While the present invention is not necessarily limited to such approaches, various aspects of the invention may be appreciated through a discussion of various examples using these and other contexts.

In one example embodiment, the present invention includes a computer processing system for a business transaction such as a shipment transaction involving a shipper and a carrier. This approach has been found to be particularly advantageous for a system which efficiently automates the payment of a shipment transaction and efficiently provides access to shipment information.

In another example embodiment, the present invention includes a system that automates the transaction process to thereby provide a convenient transaction protocol between the delivery, billing, and payment aspects of the transaction.

As shown in FIG. 1, a transaction approach involves at least two parties to a transaction (shown by way of example as a shipper 20 and carrier 22), according to another example embodiment of the present invention. A shipper processor 24 initiates the shipment transaction, e.g., by acting in conjunction with a BOL rating engine 30 to generate a rated BOL. The shipper processor sends the rated BOL to a data processing device 34 of a shipper access terminal 32. The data processing device 34 generates transaction information and sends the transaction information to a central processor 40. The central processor 40 identifies and centrally tracks the transaction information, for example by identifying transaction document characteristics for identifying and tracking a particular transaction. A carrier processing device 46 receives proof of delivery information (e.g., an electronic transaction document) and sends this information to the central processor 40. The central processor 40 processes and stores all pertinent shipment information (e.g., characteristics of the shipper and carrier transaction documents used to identify them as part of a transaction between the shipper and carrier) in a data storage unit 42. The central processor 40 further allows immediate access to this information by the shipper 20, the carrier 22, and other authorized users, for example with a particular user being authorized to access information pertinent to a transaction with the particular user's own transaction identification characteristics. This approach reduces the administrative costs of the shipper 20 and the carrier 22 and allows a user to access information without necessarily knowing other users' transaction identification information.

The central processor 40 optionally interfaces with an improved payment system including an issuing institution 44 and a paying institution 52. An issuing processor 45 of the issuing institution 44 maintains a credit account for the shipper 20 and debits the shipper's account for the cost of the shipment. A paying processor 54 of the paying institution 52 tenders payment to the carrier 22.

Figure 2:
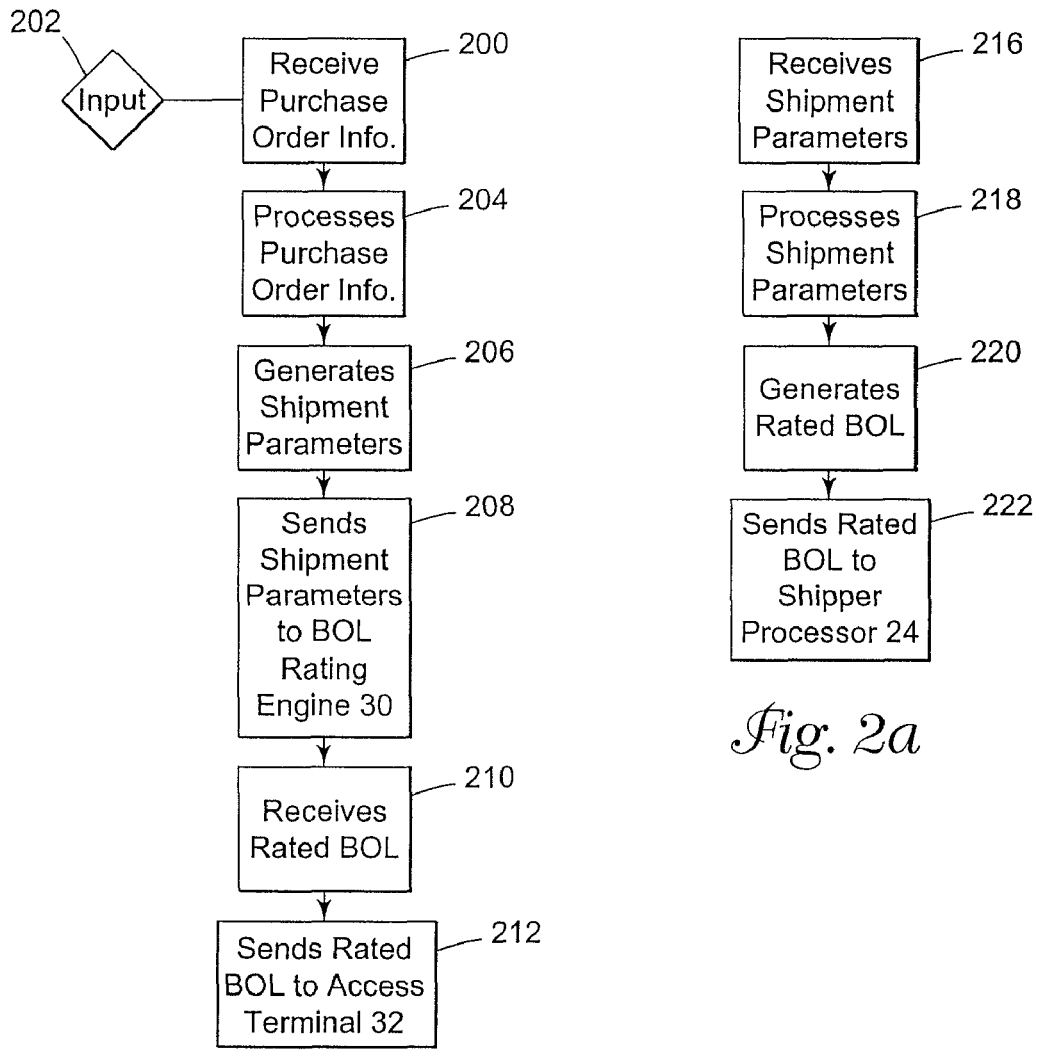
FIG. 2 is a block diagram illustrating an example flowchart for programming the shipper processor 24 of FIG. 1 according to the present invention.

FIG. 2 is a block diagram illustrating an example flowchart for programming the shipper processor 24 of FIG. 1 according to the present invention. According to this example flowchart, the shipper processor 24 receives 200 an input of relevant purchase order information for storage and processing using an adequate input device 202. Using a conventional desktop PC for example, a keyboard and mouse are adequate input devices. Using a more complex computer arrangement, a digital retrieving device, such as an information scanner, is used to offset some of the labor associated with this inputting effort.

The shipper processor 24 processes 204 the purchase order information including referencing inventory control and customer information systems to generate 206 shipment parameters that can be used, for instance, to identify a particular transaction. In a particular application, the shipment parameters include the identity of the carrier, identity of the receiver, the number of units, the weight of the shipment, the destination of the shipment, the date of shipment, and the estimated date of delivery. The shipper processor 24 is located at the shipper's premises so that the shipper processor 24 receives accurate information resulting in further reliability and efficiency of the system.

The shipper processor 24 electronically sends 208 the shipment parameters to the BOL rating engine 30. The transmission is accomplished conventionally. The BOL rating engine 30 of the illustrated embodiment of FIG. 1, is designed to suit the needs of the particular shipper, the type of goods shipped, and to provide an interface to the shipper processor 24. Conventionally, BOL rating engines, which are in use today, are implemented using a computer processing device such as a stand-alone personal computer, a personal computer connected to a network, or a conventional mainframe.

FIG. 2a is a block diagram illustrating an example flowchart for programming the BOL Rating Engine 30 of FIG. 1 according to the present invention. The BOL rating engine receives 216 the shipment parameters and processes 218 the shipment parameters. The BOL Rating Engine 30 generates 220 a rated BOL. The BOL rating engine 30 is programmed to an agreed upon rate structure by the shipper 20 and carrier 22. As a result, the BOL rating engine 30 produces consistently rated BOL's. In addition, the shipper 20 and the carrier 22 do not have to audit the engine often. Existing systems require frequent auditing of the results of the BOL rating engine. With no post audit adjustments, the payment to the carrier 22 is definite.

The BOL rating engine 30 sends 222 the rated BOL to the shipper processor 24. In a particular application, the BOL rating engine 30 is included in the shipper processor 24. The shipper processor 24 performs the rating function of the BOL rating engine 30 so that there is no need to send the shipment parameters to an external BOL rating engine.

The shipment parameters are processed and a rated BOL is generated solely by the shipper processor 24.

Using this approach, the process in which a rated BOL is produced is useful in that only one BOL rating engine 30 is needed for the entire shipment transaction system. This saves duplicate efforts by the carrier 22 and ensures exact payment. In addition, the cost depicted on the BOL is the final cost of shipment. Therefore, the shipper 20 and carrier 22 will immediately know the final cost of shipment before the goods are delivered. The BOL rating engine 30 removes ambiguity from the shipment transaction payment process, which significantly offsets time consuming payment disputes.

The shipper processor 24 receives 210 the rated BOL and sends 212 the rated BOL to a shipper access terminal 32 located at the shipper's premises. In an alternative embodiment, the BOL rating engine 30 is located off the shipper's premises so that the shipper processor 24 can access the BOL rating engine 30 on an as-needed basis. One advantage is that one standardized BOL rating engine could be electronically linked to multiple shipper processors thereby reducing the cost to each individual shipper.

Figure 3:
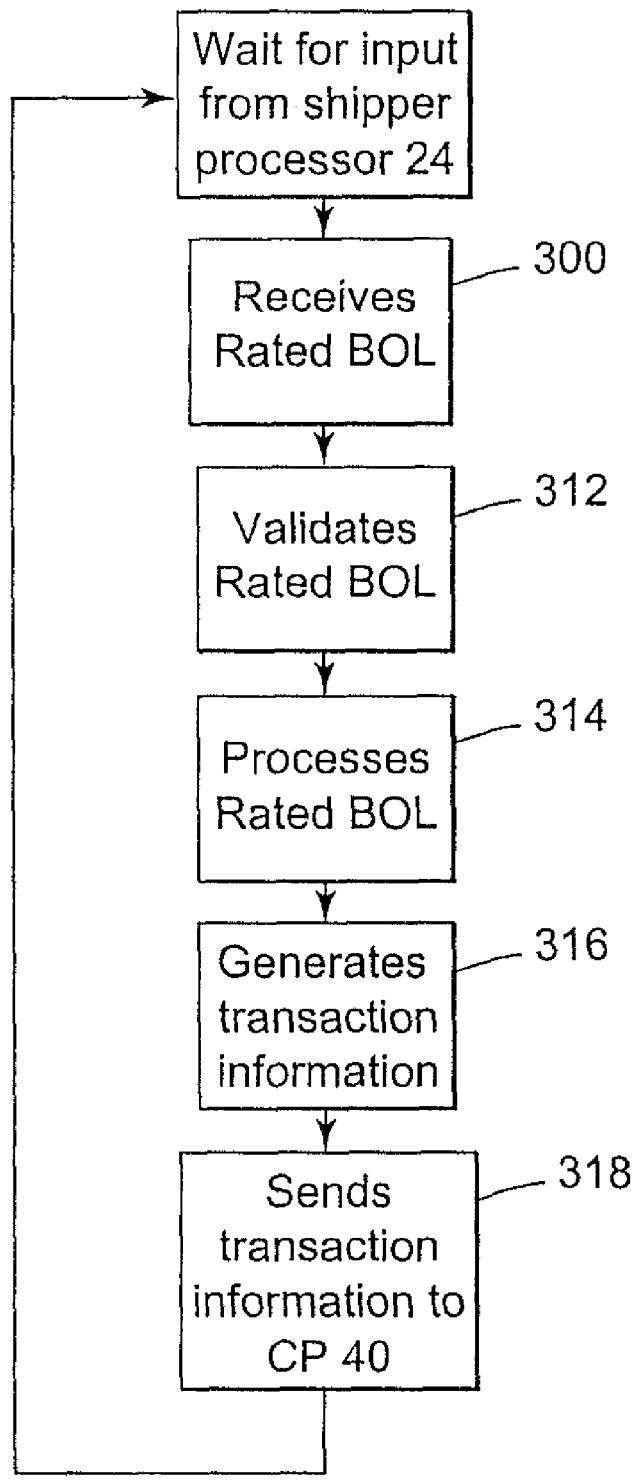
FIG. 3 is a block diagram illustrating an example flowchart for programming the data processing device 34 of FIG. 1 according to the present invention.

FIG. 3 is a block diagram illustrating an example flowchart for programming the data processing device 34 of FIG. 1 according to the present invention. The shipper access terminal 32 contains a data processing device 34 that receives 300 the rated BOL. The data processing device 34 validates 314 the rated BOL to ensure that the rated BOL contains data that is complete, error-free, and properly formatted. The data processing device 34 processes 312 the rated BOL and generates 316 a list of transaction information. The transaction information includes the information as seen in Table 1 below and includes, for example, transaction characteristics that identify a particular transaction to which several transaction documents belong. The columns in Table 1 represent the following: Data Element is the data that will reside in that particular element location; Length is the length of the data element; Type is the type of data element which is either numeric or alphanumeric; and Description simply describes the function of the data element if necessary.

TABLE 1

| Transaction Information | | | |
|---|---|---|---|
| Data Element | Length | Type | DESCRIPTION |
| Shipper ID | 10 | N | Record ID. |
| Dock ID | 3 | N | Record ID. |
| Bill of Lading # | 15 | AN | Record ID. |
| Ship Date | 8 | N | Record ID, reporting. |

TABLE 1-continued

Transaction Information

| Data Element | Length | Type | DESCRIPTION |
|---|---|---|---|
| SCAC | 4 | A | Standard Carrier Alpha Code, a national standardized carrier identification code. |
| Carrier Vendor Number | 10 | N | Alternate index, allows Shipper 20 to specify its vendor number for a given carrier 22. |
| Customer Number | 10 | N | Alternate index, allows shipper 20 to specify its customer number for a given receiver. |
| Customer PO # | 15 | AN | Alternate index, reporting. |
| Shipper Order # | 15 | AN | Alternate index. |
| Vendor Order Number | 15 | AN | Reporting, alternate locator, carrier 22 PO associated with shipment. |
| Shipper Name | 35 | AN | |
| Shipper Contact Person | 20 | A | |
| Shipper Phone # | 15 | AN | |
| Origin Designator | 10 | AN | |
| City | 20 | AN | |
| State | 2 | A | |
| ZIP Code | 9 | N | |
| Division Code | 2 | AN | |
| Reference B/L # 1 | 15 | AN | Consolidated Shipments. |
| Reference B/L # 2 | 15 | AN | Consolidated Shipments. |
| Reference B/L # 3 | 15 | AN | Consolidated Shipments. |
| Bill of Lading | 1 | AN | Reporting. |
| Type Shipment Mode | 3 | AN | Less than Truck Load(LTL), Truck Load (TL), Rail (RAI), AIR. |
| Inbound, Outbound Flag | 1 | AN | |
| Prepaid, Collect Flag | 1 | AN | |
| COD Flag | 1 | N | |
| COD Amount | 9.2 | N | |
| Shipment Value | 9.2 | N | |
| Driver Name | 20 | AN | |
| Trailer/Car # | 15 | AN | |
| Trailer/Car Seal # | 15 | AN | |
| Import, Export Flag | 1 | AN | |
| # Stops | 2 | N | |
| Stop Off Charges | 7.2 | N | |
| Rated Freight Charges | 9.2 | N | |
| Cube Dimensions | 5 | N | |
| Shipment "as weight" | 7.2 | N | |
| Accessorial Charges | 7.2 | N | |
| Total Freight Charges | 9.2 | N | |
| Destination Name | 25 | AN | |
| Destination City | 20 | AN | |
| Destination State | 2 | A | |
| Destination Zip Code | 9 | N | |
| Destination Area Code | 3 | N | |
| Destination Prefix | 3 | N | |
| Destination Phone | 4 | N | |
| Mileage | 5 | N | |

The data processing device 34 sends the transaction information to a central processor 40. In one embodiment, the data processing device 34 is implemented using a conventional personal computer programmed to operate under the control of an operating system stored in the memory. These types of computer arrangements are not presently programmed to conventionally interface with a central processing center and a processing device located at a shipper's premises. Interfacing the central processor 40 with shipper access terminal 32 has been found useful in that the shipper access terminal 32 can control the quantity, quality, and timing of information that is transmitted between the shipper processor 24 and the central processor 40. The access terminal 32 can also control the communication sessions between the shipper processor 24 and the central processor 40. The shipper access terminal 32 is designed so that the shipper 20 may directly access the transaction information. The shipper 20 will not be allowed to make changes to the transaction information, but is able to add additional information. This ensures the integrity of the transaction information. Using the access terminal 32 in this manner, the data processing device 34 can receive real-time information from the shipper processor 24 regarding the shipment transaction.

In an alternative embodiment, the shipper access terminal 32 is linked to a magnetic stripe card reader. The card reader accepts a card and transmits the data contained therein to the data processing device 34 of the shipper access terminal 32. The magnetic stripe card reader accepts an identification card from a user of the system. The identification card contains relevant user information. In an alternative application, the access terminal 32 is linked to a bar code reader which is designed to receive information from a bar code and input the bar code information into the data processing device 34. The bar code is printed on the BOL or on a carrier identification card.

The data processing device 34 sends 318 the transaction information to the central processor 40. The design of the central processor 40 is dictated by the desired speed, the number of users, and the amount of data to be processed.

Figure 4:
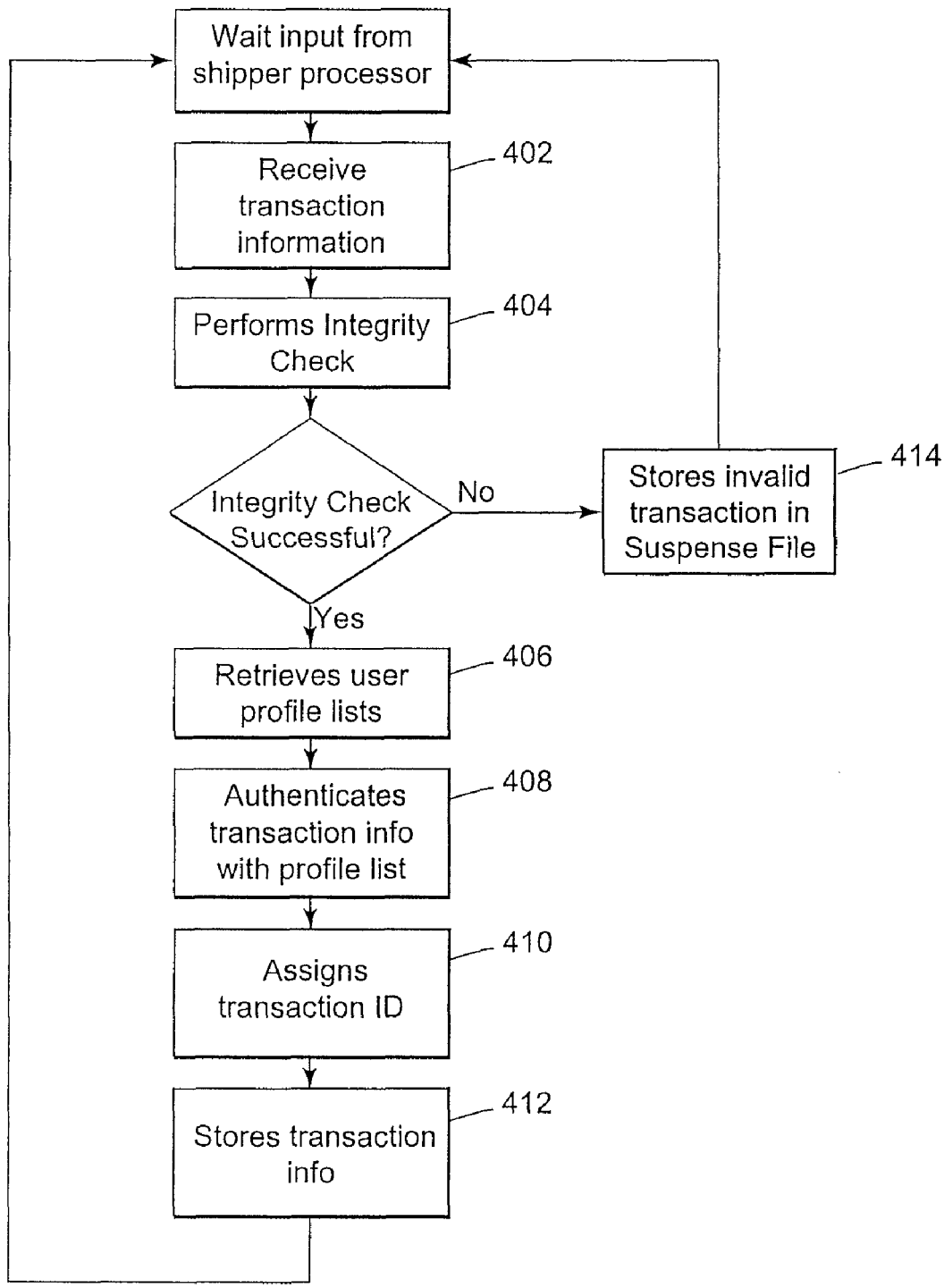
FIG. 4 is a block diagram illustrating an example flowchart for programming the central processor 40 of FIG. 1 with manipulating the transaction information according to the present disclosure.

FIG. 4 is a block diagram illustrating an example flowchart for programming the central processor 40 of FIG. 1 to manipulate the transaction information according to the present invention. The central processor 40 receives 402 the transaction information and performs 404 an integrity check on the incoming information to ensure that the information is correctly formatted and contains no errors. If the integrity check is unsuccessful, the transaction information is stored in a suspense file in a data storage unit 42. Once the error is corrected, the corrected transaction may be sent into the normal process flow. If the integrity check is successful, the central processor 40 retrieves 406 authorized user profile lists from the data storage unit 42.

The data storage unit 42 is essentially a memory unit that stores information relevant to the shipping transaction. The design of the data storage unit 42 is dictated by the amount of data needed to be stored.

The authorized user profile lists represent the users and combination of users that are authorized to use the system. Authorized user profile lists include a shipper profile list, a carrier profile list, a carrier/shipper profile list, and a shipper access terminal profile list. The profile lists provide the cross-reference between the payment ID (assigned by central processor 40), an account ID (assigned by an issuing processor 45), and a merchant number (assigned by a paying processor 54). These profile lists and corresponding cross-reference can therefor be used to identify identification information, and thus transaction documents, that belong to particular transactions.

An authorized shipper profile list identifies information regarding the shipper and the shipment as can be seen below in Table 2.

TABLE 2

Shipper Profile

| DATA ELEMENT | WIDTH | TYPE | DESCRIPTION |
|---|---|---|---|
| Shipper ID | 10 | N | Uniquely identifies a legal entity using a single BOL system, assigned by the CP 40. |
| Account ID | 16 | N | Account # assigned to shipper 20 by issuing processor 54. |
| Shipper Name | 32 | A/N | |
| Shipper Address 1 | 32 | A/N | Headquarters Address |
| Shipper Address 2 | 32 | A/N | |
| Shipper City | 28 | A/N | |
| Shipper State/Province | 3 | A/N | |
| Shipper Country | 3 | A/N | |
| Shipper Contact | 32 | A/N | |
| Shipper Phone | 10 | N | |
| Open Date | 8 | N | Supplied by CP 40 when record is built. YYYYMMDD format. |
| Date of First Activity | 8 | N | Automatically supplied by CP 40 when first BOL record is received by CP 40. YYYYMMDD format. |
| Date of Last Activity | 8 | N | Automatically updated by CP 40 every time a BOL record is processed. |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by system when current status field is updated. YYYYMMDD format. |
| Pending Status | 4 | A | User will key status, valid values are OPEN, CLSD, HOLD. |
| Effective Date | 8 | N | Default to today's date with user ability to override to a future date. YYYYMMDD format. |
| Last update date | 8 | N | Automatically stamped by CP 40. |
| Last update time | 4 | N | Automatically stamped by CP 40. HHMM format. |
| Last Update User | 8 | A/N | Automatically pulled from user profile by CP 40. |

An authorized carrier profile list identifies information regarding the carrier 22 and the shipment transaction as can be seen below in Table 3. Included in the carrier profile is a merchant number that a paying processor 54 assigns to the carrier 22. Each carrier 22 can have multiple merchant numbers if desired. This allows carrier flexibility to assign different merchant numbers for different regions or different shippers. This flexibility facilitates the carrier's business management process.

TABLE 3

Carrier Profile

| COLUMN NAME | DATA WIDTH | DATA TYPE | DESCRIPTION |
| --- | --- | --- | --- |
| SCAC | 4 | A/N | 4 character code that uniquely identifies a Carrier 22. |
| Merchant Number | 10 | N | Paying processor 54 assigns to each carrier. |
| Carrier 22 Name | 32 | A/N | DBA name of Carrier HQ. |
| Carrier Address 1 | 32 | A/N | |
| Carrier Address 2 | 32 | A/N | |
| Carrier City | 28 | A/N | |
| Carrier State/Province | 3 | A/N | |
| Carrier Country | 3 | A/N | |
| Carrier Contact | 32 | A/N | Name of primary contact at Carrier HQ. |
| Carrier Phone | 10 | N | Phone number of primary contact at Carrier HQ. |
| Open Date | 8 | N | Automatically supplied by CP 40 when record is built. YYYYMMDD format. |
| Date of First Activity | 8 | N | Automatically supplied by CP 40 when first BOL record is received by system on this Carrier 22. YYYYMMDD format. |
| Date of Last Activity | 8 | N | Automatically updated by system every time a BOL record is processed for this Carrier 22. |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated. YYYYMMDD format. |
| Pending Status | 4 | A | User will key status. |
| Effective Date | 8 | N | Default to today's date with user ability to override to a future date. YYYYMMDD format. |
| Last update date | 8 | N | Automatically stamped by CP 40. |
| Last update time | 4 | N | Automatically stamped by CP 40. HHMM format. |
| Last Update User | 8 | A/N | Automatically pulled from user profile lists by CP 40. |

An authorized shipper/carrier profile list identifies information regarding valid shipper carrier combinations as can be seen below in Table 4.

TABLE 4

Shipper/Carrier Profile

| COLUMN NAME | DATA WIDTH | DATA TYPE | DESCRIPTION |
| --- | --- | --- | --- |
| Shipper ID | 10 | N | |
| Carrier SCAC | 4 | A/N | |
| Merchant Number | 10 | N | Assigned by Paying processor 54. If blank, use default value from carrier profile. |
| Proof of Delivery (POD) | 1 | A | "Y" for POD to be required, "N" for POD not required. |
| Type of POD | 4 | A | Identifies in what manner the POD is to be received. |
| Auto close days | 2 | N | Number of days after which the transaction will close and be paid to the Carrier. 22 regardless of whether or not POD has been posted. |
| Open Date | 8 | N | Automatically supplied by CP 40 when record is built. YYYYMMDD format. |
| Date of First Activity | 8 | N | Automatically supplied by CP 40 when first BOL record is received by system. YYYYMMDD format. |
| Date of Last Activity | 8 | N | Automatically updated by CP 40 every time a BOL record is processed. |

TABLE 4-continued

Shipper/Carrier Profile

| COLUMN NAME | DATA WIDTH | DATA TYPE | DESCRIPTION |
|---|---|---|---|
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated. YYYYMMDD format. |
| Pending Status | 4 | A | User will key status. |
| Effective Date | 8 | N | Default to today's date with user ability to override to a future date. YYYYMMDD format. |
| Last update date | 8 | N | Automatically stamped by CP 40. |
| Last update time | 4 | N | Automatically stamped by CP 40. HHMM format. |
| Last update User | 8 | A/N | Automatically pulled from user profile lists. |

An authorized shipper access terminal profile identifies the shipper 20 as well as the shipping dock. A shipper has a separate shipper access terminal profile for each dock. The central processor 40 assigns a different dock ID for each dock. The information included in the access point profile is listed below in Table 5.

TABLE 5

Access Terminal Profile

| COLUMN NAME | WIDTH | TYPE | DESCRIPTION |
|---|---|---|---|
| Shipper ID | 10 | N | Uniquely identifies a legal entity using a single BOL system. |
| Dock ID | 3 | N | Uniquely identifies a particular physical dock location with a shipper ID. |
| Account ID | 16 | N | Issuing Processor 54 assigns. Defaults from shipper profile, can be overridden by shipper. |
| Dock Name | 32 | A/N | DBA name of dock originating BOL. |
| Dock Address 1 | 32 | A/N | Street address of dock originating BOL. |
| Dock Address 2 | 32 | A/N | |
| Dock City | 28 | A/N | |
| Dock State/Province | 3 | A/N | |
| Dock Country | 3 | A/N | |
| Dock Contact | 32 | A/N | |
| Dock Phone | 10 | N | To be used for reporting against completion transaction. |
| Open Date | 8 | N | Automatically supplied by CP 40 when record is built. YYYYMMDD format. |
| Date of First Activity | 8 | N | Automatically supplied by CP 40 when first BOL record is received by system- YYYYMMDD format. |
| Date of Last Activity | 8 | N | Automatically updated by CP 40 every time a BOL record is processed. |
| Current Status | 4 | A | Automatically updated by CP 40 on the effective date if effective date was pre-entered or as part of the on-line transaction if the effective date is changed to today. Valid values are OPEN, CLSD, HOLD. |
| Current Status Date | 8 | N | Automatically updated by CP 40 when current status field is updated, YYYYMMDD format. |
| Pending Status | 4 | A | User will key status. |
| Effective Date | 8 | N | Default to today's date with user ability to override to a future date. YYYYMMDD format. |
| Last update date | 8 | N | Automatically stamped by CP 40. |
| Last update time | 4 | N | Automatically stamped by CP 40. HHMM format. |
| Last Update User | 8 | A/N | Automatically pulled from user profile lists. |

The central processor 40 authenticates 408 the transaction information by comparing elements of transaction information with the authorized user profile lists. The elements of the transaction information used for authentication include; the identity of the shipper (or, e.g., buyer), the identity of the shipper's dock, and the identity of the carrier (or, e.g., seller). In this regard, a particular transaction between a particular shipper and carrier will be authenticated by a set of data that includes both the shipper and carrier identity. If the authentication is successful, the central processor 40 assigns 410 a payment identification number (payment ID) to the transaction information and stores 412 the transaction information in the data storage unit 42. The payment ID is a unique key for the transaction record which the central processor 40 uses to centrally track the transaction (e.g., such an ID can be used as an anchor to group different transaction documents into a category for a particular transaction). The payment ID includes specific information regarding the shipment transaction including; the shipper identification number, the BOL number, and the shipping date. Using the payment ID in this manner allows the central processor 40 to more efficiently and accurately track the different documents and actions occurring within the system. The payment ID can be referenced to the specific identification numbers that any of the users may assign. The payment ID is now considered "open". Open is a term used to signify that the shipper 20 has transferred the goods to the carrier 22, and the carrier 22 has not yet completed the shipment.

If the authentication is unsuccessful, the central processor 40 stores 414 the invalid transaction in a suspense file in the data storage unit 42. When an invalid transaction is stored, a notification is sent which indicates that an error has occurred and is in need of further review and correction. Once the error is corrected, the corrected transaction may be sent into the normal process path.

Figure 5:
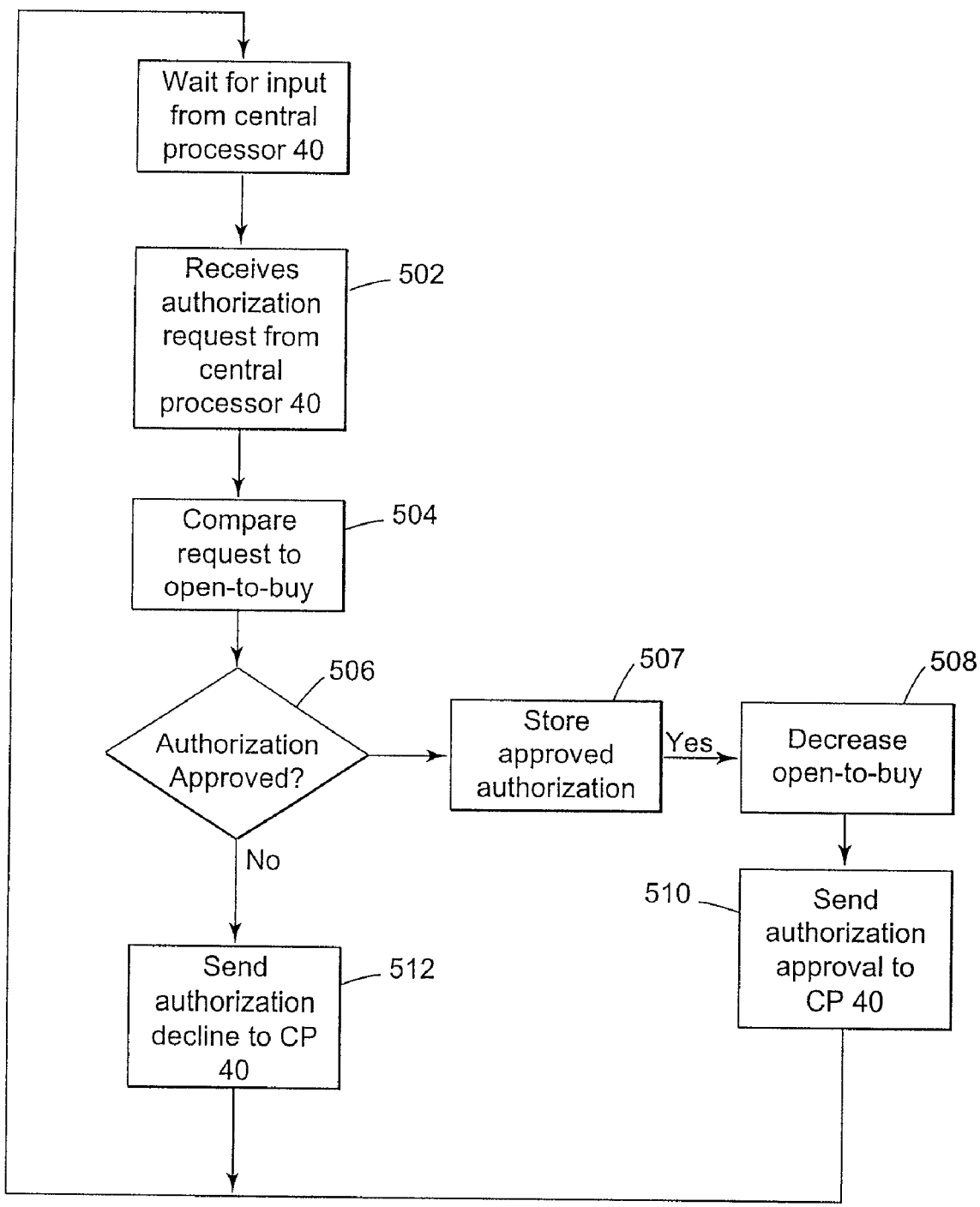
FIG. 5 is a block diagram illustrating an example flowchart for programming the issuing processor 45 of FIG. 1 with authorizing a transaction according to the present disclosure.

The central processor 40 sends the authenticated transaction information, including the shipper identity and the cost of the shipment, to an issuing institution 44 for authorization. FIG. 5 is a block diagram illustrating an example flowchart for programming the issuing processor 45 of FIG. 1 to perform an authorization check according to the present invention. The issuing institution 44 contains an issuing processor 45. The issuing processor 45 maintains accounts for one or more shippers. Each account includes information regarding credit limits, open authorizations, unpaid balances, and the resulting open-to-buy. Open-to-buy measures the unused credit limit.

The issuing processor 45 receives 502 the authorization request from the central processor 40. The issuing processor 45 compares 504 the authorization request to the open-to-buy of the shipper and attempts to approve 506 the request. If the shipper 20 has enough open-to-buy, the issuing processor 45 approves the authorization request. The issuing processor 45 stores 507 the approved authorization request and decreases 508 the open-to-buy. The issuing processor 45 sends 510 the authorization approval to the central processor 40 and the central processor 40 updates the records in the data storage unit 42. If the authorization is successful, the payment ID is considered "authorized." If the authorization is unsuccessful, the issuing processor 45 sends 512 an authorization decline to the central processor 40.

After the goods are delivered to a receiver, the payment ID is "closed". Closed refers to providing proof of delivery (POD) of the shipment in order to complete the shipment transaction. POD includes the identity of the shipper, the BOL number, the carrier invoice number, the delivery date and time, the person acknowledging receipt, and the condition of the shipment. A carrier processor 46 receives the POD and sends the information to the central processor 40.

In one embodiment, the carrier processor 46 is a conventional bar code reader. The bar code reader is used by the carrier 22 to read a bar code on the shipment. The bar code reader sends the POD information to the central processor 40.

Figure 6:
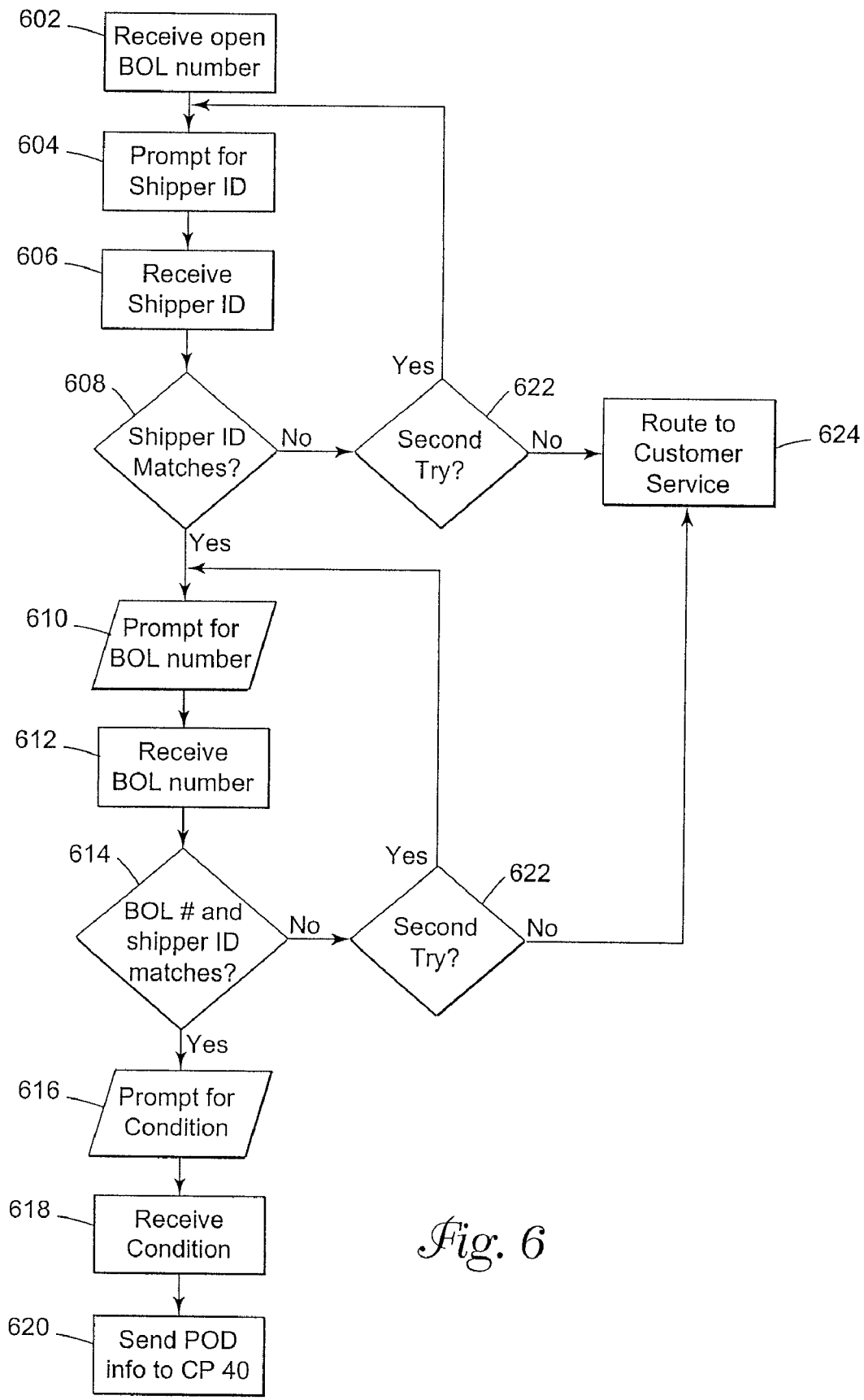
FIG. 6 is a block diagram illustrating an example flowchart for programming the VRU unit 48 according to the present disclosure.

In an alternative embodiment, the carrier processor 46 is a voice response unit 48 (VRU). FIG. 6 is a block diagram illustrating an example flowchart for programming the VRU 48 according to one embodiment of the present invention. In this embodiment, the central processor 40 extracts an open payment ID from the data storage unit 42. The central processor 40 sends information relating to the open payment ID, including the BOL number and the shipper ID, to the VRU 48. The VRU 48 receives 602 the open BOL number.

A standard touch-tone telephone is used to access the VRU 48. While the location of the telephone is not critical, locating it at the receiver's premises promotes efficiency, convenience, and accuracy. It is convenient and efficient because the carrier 22 can call the VRU 48 at the exact time the shipment is delivered. It is accurate in that the phone number of the receiver, automatically captured by the VRU 48, will identify where and when the call was made.

The VRU 48 prompts 604 the carrier 22 for the shipper ID. The VRU 48 receives 606 the shipper ID and attempts to match 608 the entered shipper ID with an open shipper ID. If the shipper ID is matched, the VRU 48 prompts 610 the carrier 22 for the BOL number. The VRU 48 receives 612 the entered BOL number and attempts to match 614 the combination of the entered BOL number and shipper ID with an open BOL number and Shipper ID. If the BOL number and shipper ID combination is matched, the VRU 48 prompts 616 the carrier 22 for condition of shipment. The VRU 48 receives 618 the condition of shipment and sends 620 the POD information which includes the BOL number, the shipper ID, and the condition of the shipment to the central processor 40.

If the VRU 48 cannot match either the shipper ID or the BOL number, the VRU 48 prompts 622 the carrier 22 to either try again or routes 624 the carrier 22 to customer service where the problem can be resolved.

Figure 7:
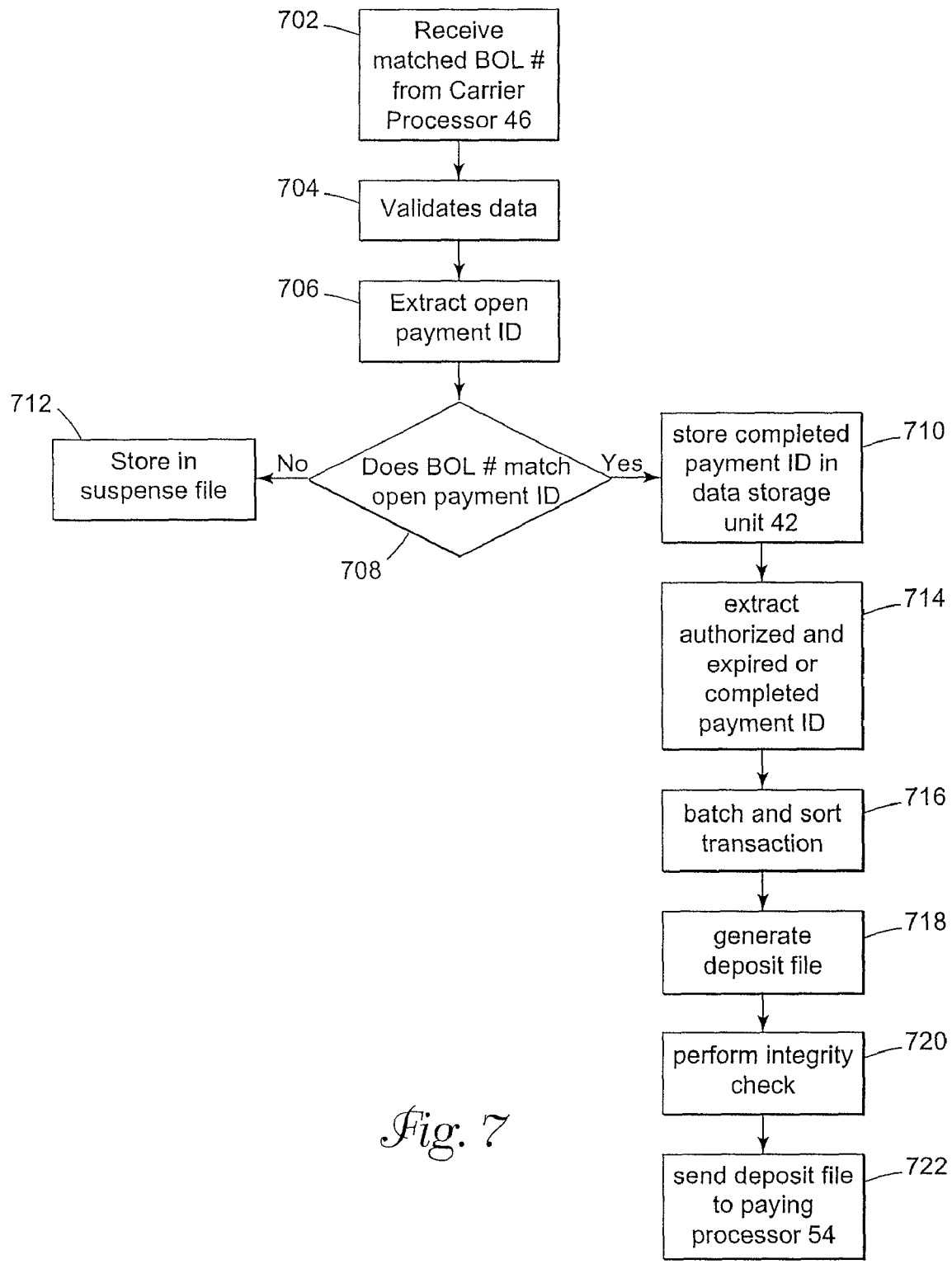
FIG. 7 is a block diagram illustrating an example flowchart for programming the central processor 40 of FIG. 1 with generating a deposit file according to the present disclosure.

FIG. 7 is a block diagram illustrating an example flowchart for programming the central processor 40 of FIG. 1 and generating a deposit file according to the present invention. The central processor 40 receives 702 transaction information including the matched BOL number, the shipper ID, and the condition of the shipment from the carrier processor 46. The central processor 40 validates 704 the incoming data (e.g., transaction document with BOL data) to ensure that it is error free and properly formatted. The central processor 40 extracts 706 the open payment ID from the data storage unit 42. The central processor 40 authenticates 708 the matched BOL number with an open payment ID, for example by matching the BOL number and open payment ID to a particular anchor-type ID associated with a transaction. If the BOL number and payment ID are authenticated (e.g., include transaction identification data that match user profile data for the transaction), the payment ID is considered complete. The central processor stores 710 the completed transaction and corresponding payment ID in the data storage unit 42. If authentication is unsuccessful, the central processor 40 stores 712 the information in a suspense file where the problem can be manually resolved as discussed above.

A payment ID can be completed in the above manner, or a payment ID can expire. A payment ID expires when a preprogrammed number of days have elapsed since the shipping date. This preprogrammed number of days is defined as auto close days in the data storage unit 42. A particular transaction is identified by the shipper and carrier to expire on a specific date, the effective date, whether or not the proof of delivery is received. On the effective date, the payment process begins. This has the advantage that the carrier 22 will be paid for every shipment carried. Payment to the carrier 22 is expedited if proof of delivery is received.

The central processor 40 periodically extracts 714 from the data storage unit 42 the transactions that are listed as "completed and authorized" or "expired and authorized." The central processor 40 sorts and batches 716 the transactions by the merchant number. The central processor 40 generates 718 a deposit file 50 for those authorized transactions which are completed or expired and which have not been previously extracted. In a particular application, one deposit file 50 is created for all transactions completed by each carrier. The deposit file 50 is formatted so that it is compatible with the paying processor's 54 format. The deposit file 50 includes the payment ID, the account ID, the carrier identity, the BOL number, the destination city, the destination state, the destination zip code, and the cost of shipment. The cost of the shipment represents the amount that is owed by the shipper 20 and payable to the carrier 22.

The central processor 40 performs 720 a general integrity check on the deposit file 50. The integrity check includes: ensuring that the payment ID has been authorized, ensuring that the BOL is completed or expired, and ensuring that payment has not yet occurred for the particular payment ID.

If the central processor 40 validates the deposit file 50, the processor 40 sends 722 the deposit file 50 to a paying processor 54 of a paying institution 52. In a particular application, the deposit file 50 is conventionally sent via a telephone transmission. The paying institution has a paying processor 54 which processes financial information and maintains financial accounts for the carrier 22. The paying processor 54 is generally designed to process financial information. The paying institution 52 maintains one or more accounts for each carrier 22.

Figure 8:
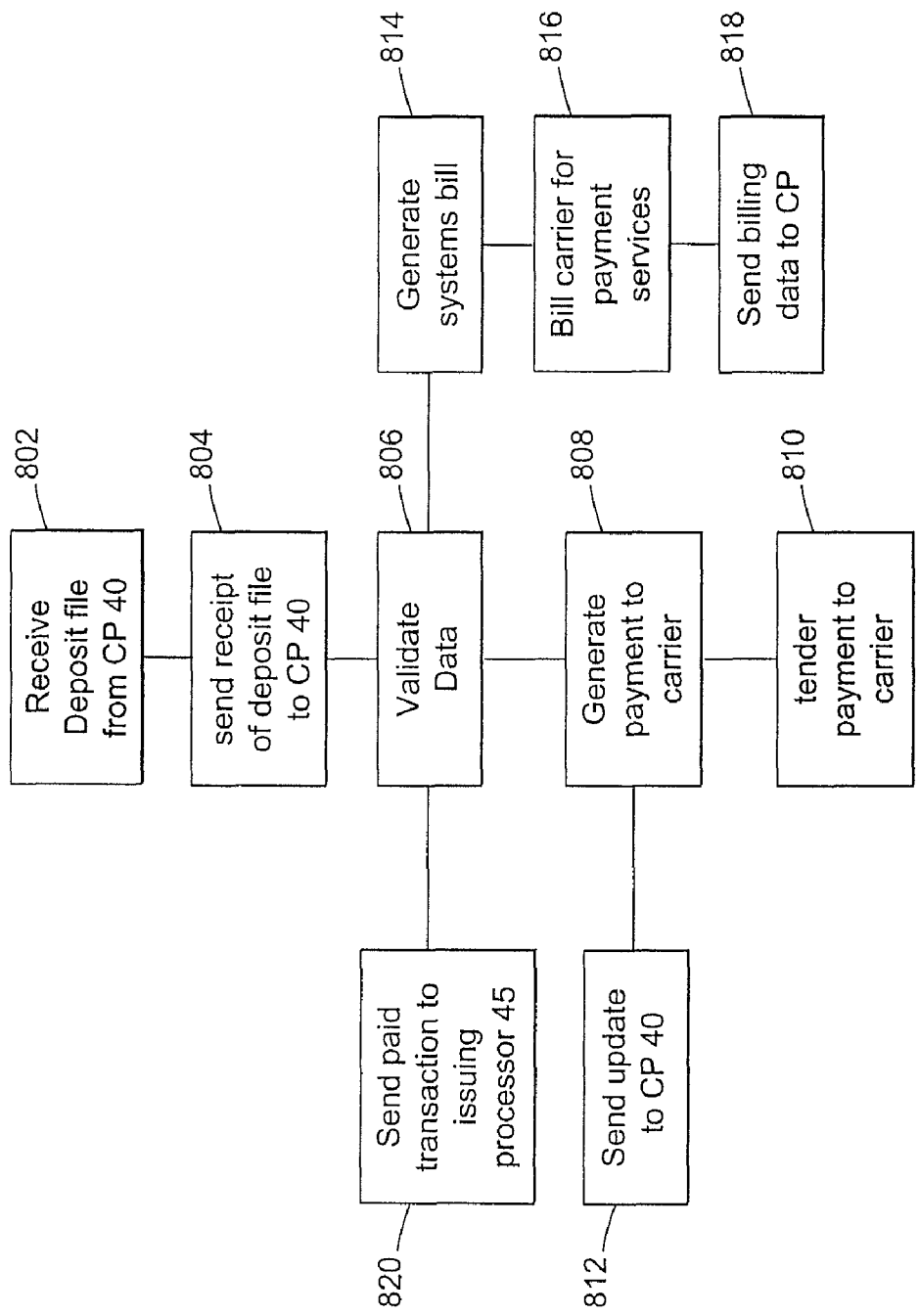
FIG. 8 is a block diagram illustrating an example flowchart for programming the paying processor 54 of FIG. 1 according to the present disclosure.

FIG. 8 is a block diagram illustrating an example flowchart for programming the paying processor 54 of FIG. 1 according to the present invention. The paying processor 54 receives 802 the deposit file 50 and sends 804 a confirmation message to the central processor 40 that the deposit file 50 was received.

The paying processor 54 validates 806 the incoming deposit file and generates 808 payment to the carrier 22. The paying processor 54 tenders 810 payment to the carrier 24 and sends 812 this information to the central processor 40 so that the central processor 40 can update the data storage unit 42. In a particular application, the paying processor 54 tenders payment by directly paying the carrier 22. In an alternative embodiment, the paying processor 54 sends the payment to the carrier's bank conventionally through the Federal Reserve's Automated Clearing House.

Using this approach for generating payments to the carrier 22, the carrier 22 is paid relatively soon after the carrier 22 has completed the shipment. This provides the carrier 22 with improved cash flow and reduces the carrier's working capital requirements. Another advantage is that the carrier 22 does not have to audit or rate the payment, which saves time and money. This streamlined approach reduces the carrier's administrative costs associated with processing a payment.

The paying processor 54 generates 814 a systems bill for the carrier 22. This systems bill represents the amount the carrier 22 owes for the service provided using one or more of the example embodiments of the present invention. The paying processor 54 sends 816 the systems bill to the carrier 22. The paying processor 54 sends 818 the systems bill information to the central processor 40 where the information is stored in the data storage unit 42. The paying processor 54 delivers 820 the paid shipment transactions to the issuing processor 45 of the issuing institution 44.

Figure 9:
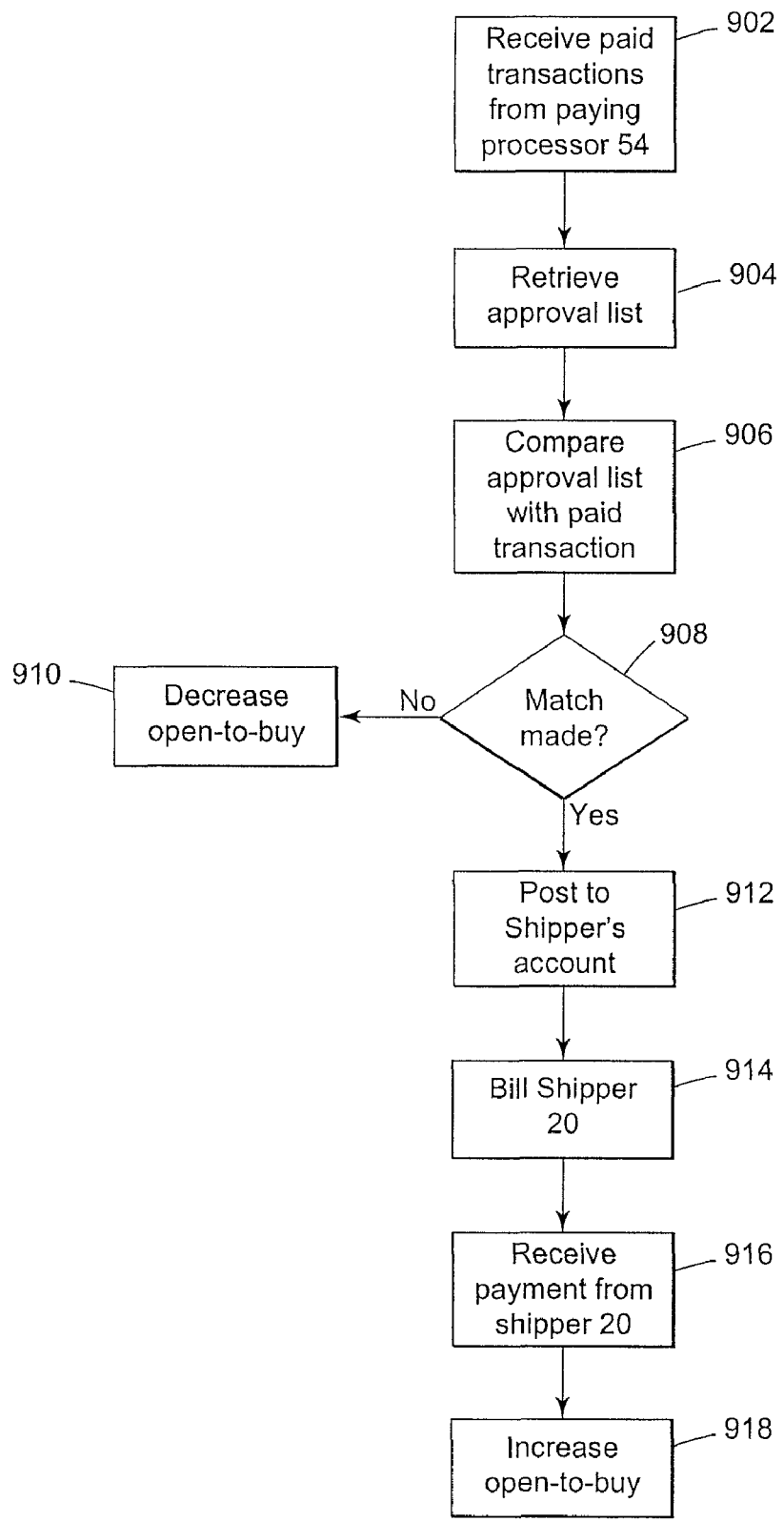
FIG. 9 is a block diagram illustrating an example flowchart for programming the issuing processor 45 of FIG. 1 with crediting a transaction according to the present disclosure.

The issuing institution 44 maintains one or more accounts for the shipper 20 and extends and manages credit to the shipper 20. The issuing processor 45 maintains the amount paid to each carrier 22 on behalf of each shipper 20. FIG. 9 is a block diagram illustrating an example 20 flowchart for programming the issuing processor 45 of FIG. 1 to credit a transaction according to the present invention. The issuing processor 45 receives 902 the paid transactions from the paying processor 54. The issuing processor 45 retrieves 904 the approved authorization list and compares 906 the authorization list with the paid transactions. The issuing processor 45 attempts to match 908 the paid transactions with an authorized transaction (e.g., by matching transaction payment documents to transaction identification information defined by identification information for parties to the transaction as discussed above). If a match is made, no change is made to the open to buy. If a match is not made, the issuing processor 45 decreases 910 the open to buy.

The issuing processor 45 posts 912 the cost of shipment for all paid transactions to the shipper's account, thereby increasing the balance due from the shipper 20. The issuing processor 45 periodically bills 914 the shipper 20 for the posted financial transactions paid on behalf of the shipper 20 and periodically receives 916 payment from the shipper 20. When the issuing processor 45 receives payment, the issuing processor 45 posts payment to the shipper's account and increases 918 the open-to-buy.

The issuing processor 45 communicates with the central processor 40 and sends information regarding shipper 20 payment and billing. The central processor 40 updates the data storage unit 42 with this information, with identification information for the information representing, e.g., common transaction information identifying a particular transaction.

In an alternative embodiment, the paying institution 52 is incorporated into the issuing institution 44. This results in one processor performing the functions of the issuing processor 45 and the paying processor 54.

With these approaches involving a computer processing system for a shipment transaction involving a shipper and a carrier, the data storage unit 42 and central processor 40 interface to store and provide value-laden information to the users of the system. The central processor 40 provides a security check for all information entering and leaving the data storage unit 42. The central processor 40 edits incoming files and provides on-line alarms for duplicate files, stale dated files, out of balance files, and files with corrupt data. The central processor 40 maintains a suspense file in the data storage unit 42 where incoming invalid transaction information and unmatched proof of delivery information are stored. With a centrally located suspense file, the problem resolution process is more efficient.

The central processor 40 maintains data views and tables and stores this information in the data storage unit 42. The central processor 40 maintains a BOL Header Table for each BOL number, which generally includes a summary of all information relating to that shipment transaction. This information is shown in the Table 6 below. The source of the particular data element is indicated in column four of Table 6.

TABLE 6

BOL Header Data Elements

| Data Element | Length | Type | Source | Purpose |
| --- | --- | --- | --- | --- |
| Shipper ID | 10 | N | CP 40 | Record ID |
| Dock ID | 3 | N | CP 40 | Record ID |
| Account ID | 16 | N | CP 40 | Record ID, reporting. |
| Bill of Lading # | 15 | A/N | Shipper | Record ID |
| Ship Date | 8 | N | Shipper | Record ID, reporting. |
| SCAC | 4 | A | Shipper | Alternate index, identifies Carrier. |
| Merchant # | 10 | N | CP 40 | Alternate index, for CP 40 usage. |
| Vendor # | 10 | N | Shipper | Alternate index, allows Shipper to specify its vendor number for a given carrier. |
| Customer Number | 10 | N | Shipper | Alternate index, allows Shipper to specify its customer number for a given receiver. |
| Customer PO # | 15 | A/N | Shipper | Alternate index, reporting. |
| Shipper Order # | 15 | A/N | Shipper | Alternate index. |
| Vendor Order Number | 15 | A/N | Shipper | Reporting, alternate locator. |
| Shipper Name | 35 | A/N | Shipper | Reporting. |
| Shipper Contact Person | 20 | A | Shipper | Claims. |
| Shipper Phone # | 15 | A/N | Shipper | Claims. |
| Origin Designator | 10 | A/N | Shipper | Reporting. |
| City | 20 | A/N | Shipper | Reporting. |
| State | 2 | A | Shipper | Reporting. |
| ZIP Code | 9 | N | Shipper | Reporting. |
| Division Code | 2 | A/N | Shipper | Reporting. |
| Reference B/L #1 | 15 | A/N | Shipper | Consolidated Shipments. |
| Reference B/L #2 | 15 | A/N | Shipper | Consolidated Shipments. |
| Reference B/L #3 | 15 | A/N | Shipper | Consolidated Shipments. |
| Bill of Lading Type | 1 | A/N | Shipper | Reporting. |
| Shipment Mode | 3 | A/N | Shipper | LTL, TL, RAI, AIR. |
| Inbound, Outbound Flag | 1 | A/N | Shipper | Reporting. |
| Prepaid, Collect Flag | 1 | A/N | Shipper | Reporting. |
| COD Flag | 1 | A/N | Shipper | Reporting. |
| COD Amount | 9.2 | A/N | Shipper | Reporting |
| Shipment Value | 9.2 | A/N | Shipper | Reporting, claims. |
| Driver Name | 20 | A/N | Shipper | Reporting, claims. |
| Trailer/Car # | 15 | A/N | Shipper | Reporting, claims. |
| Trailer/Car Seal # | 15 | A/N | Shipper | Reporting, claims. |
| Import, Export Flag | 1 | A/N | Shipper | Reporting. |
| # Stops | 2 | N | Shipper | Reporting. |
| Stop Off Charges | 7.2 | A/N | Shipper | Reporting. |
| Rated Freight Charges | 9.2 | A/N | Shipper | Payment, reporting. |
| Cube Dimensions | 5 | N | Shipper | Reporting. |
| Shipment "as weight" | 7.2 | N | Shipper | Reporting, claims. |
| Accessorial Charges | 7.2 | A/N | Shipper | Payment, reporting. |
| Total Freight Charges | 9.2 | A/N | Shipper | Payment, reporting. |
| Destination Name | 25 | A/N | Shipper | Reporting. |
| Destination City | 20 | A/N | Shipper | Reporting. |
| Destination State | 2 | A | Shipper | Reporting. |
| Destination Zip Code | 9 | N | Shipper | Reporting. |
| Destination Area Code | 3 | N | Shipper | Reporting, verification. |
| Destination Prefix | 3 | N | Shipper | Reporting, verification. |
| Destination Phone | 4 | N | Shipper | Reporting, verification. |
| Mileage | 5 | N | Shipper | Reporting. |
| Voucher/Check # | 12 | A/N | CP 40 | Inquiry. |
| Ship Date | 8 | N | Shipper | Life cycle tracking. |
| CP 40 Receipt Date | 8 | N | CP 40 | Life cycle tracking. |
| Storage Insert Date | 8 | N | CP 40 | Life cycle tracking. |
| VRU Extract Date | 8 | N | CP 40 | Life cycle tracking. |
| Authorization Date | 8 | N | CP 40 | Life cycle tracking. |
| Authorization # | 6 | A/N | Issuing Proc. 45 | From authorization response feed. |
| Auth Response Code | 2 | A/N | Issuing Proc. 45 | From authorization response feed. |
| Delivery Date | 8 | N | CP 40 | Life cycle tracking. |
| Completion Date | 8 | N | CP 40 | Life cycle tracking. |
| Deposit Extract Date | 8 | N | CP 40 | Life cycle tracking. |
| Settlement Date | 8 | N | Paying Proc. 54 | From settlement record. |
| Settlement DDA # | 12 | A/N | Paying Proc. 54 | From settlement record. |
| Shipper Billing Date | 8 | N | Issuing Pfoc. 45 | Issuing From statement billing file feed for life cycle tracking. |
| Delivery Area Code | 3 | N | Carrier Proc. | POD tracking, claims. |
| Delivery Prefix | 3 | N | Carrier Proc. 46 | POD tracking, claims. |
| Delivery Phone | 4 | N | Carrier Proc. 46 | POD tracking, claims. |

TABLE 6-continued

BOL Header Data Elements

| Data Element | Length | Type | Source | Purpose |
| --- | --- | --- | --- | --- |
| Receiver Name | 20 | A | Carrier | POD tracking, claims. |
| Receipt Condition | 1 | A | Carrier | Quality of service tracking, claims. |
| POD ID | 15 | A/N | Carrier Proc. 46 | 22(such as FedEx, UPS) who has accepted POD system. |

In addition, the central processor 40 maintains BOL line item details from the transaction information. The BOL line item details generally consist of information relating to the goods of the shipment as can be seen below in Table 7.

TABLE 7

BOL Line Item Detail Data Elements

| Data Element | Length | Type | Source | Purpose |
| --- | --- | --- | --- | --- |
| Shipper ID | 16 | N | CP 40 | Record ID. |
| Bill of Lading # | 15 | A/N | Shipper | Record ID. |
| Ship Date | 8 | N | Shipper | Record ID. |
| Product Description | 28 | A/N | Shipper | Reporting, claims. |
| Product ID | 8 | A/N | Shipper | Reporting, claims. |
| Product Value | 7.2 | A/N | Shipper | Claims. |
| Haz Mat Flag | 1 | A/N | Shipper | Reporting, claims. |
| Item Weight | 7.2 | N | Shipper | Reporting, claims. |
| Total Pcs | 5 | N | Shipper | Reporting. |
| Item "as weight" | 7.2 | N | Shipper | Reporting. |
| Unit of Measure | 4 | A/N | Shipper | Reporting, claims. |
| Accounting Code | 25 | A/N | Shipper | Reporting. |
| Item Freight Charges | 7.2 | N | Shipper | Reporting. |

In the example system application of FIG. 1, the carrier 22 will not have access to the BOL line item product value, but will be able to see the line item freight charges.

The shipment transaction system of FIG. 1 is also useful in that the system allows multiple users to obtain information about the same shipment from the same source. Since the system supplies information from the same source, all users will obtain the same information at the same time (using, e.g., a single user ID to access all documents pertinent to a particular transaction to which the user has authorized access).

In an alternative embodiment, multiple users access the shipment information via the central processor 40. The shipment information is stored in the data storage unit 42. The central processor 40 is electronically linked to a multitude of user stations. The link between the central processor 40 and a user station allows for conventional two-way communication. The user station is, e.g., a standard personal computer comprising of a video display, a keyboard, a central processor, and a modem link. A user initiates a request for information by accessing the central processor 40 using the personal computer. When the user is logged into the central processor 40, the central processor 40 prompts the user to enter a password.

The central processor 40 provides a security check on all information requests. The security check is programmed such that the shipper 20 and carrier 22 are restricted to accessing only their own data. In addition, the central processor 40 is programmed such that unauthorized parties are denied access.

The central processor 40 receives informational requests from the user. The central processor 40 accesses the data storage unit 42 and extracts the requested information and transmits the information to the user's station. With this approach, users will be able to obtain current information regarding a shipment transaction.

In a particular application, once a user has access to the system, the central processor 40 will prompt the user for a range of dates of interest including the current day, the previous day, monthly total, yearly total, or a specified date range. The central processor 40 displays the transaction information, freight amounts, shipment costs, total weight, and cost per pound for various types of transactions including, e.g., transactions added to the data storage unit, transactions with proof of delivery, transactions that have expired, transactions in the suspense file, transactions paid to carrier, transactions in transit, transactions declined, and transactions approved.

The central processor 40 allows users to request a particular transaction by entering any one of a multitude of transaction elements. The central processor 40 identifies a particular transaction with reference to one or more of: the BOL number, the shipper's customer number for the receiver 22, the payment ID, the carrier's customer number for the shipper 20, the merchant number, the account ID, the receiver's order number for the shipper 20, the shipper's order number for the BOL number, and the shipping date. This transaction identification approach facilitates the establishment of a set of anchor data that can be used to identify a particular transaction; any document or query matching this anchor data will be categorized into a group for the particular transaction. Such anchor data can be stored, for example, in an anchor location identified by the anchor data. In addition, the anchor data for a particular transaction may include data from user profile information for a party to the particular transaction. This approach ensures compatibility between the user reference numbers such that the user can access information using their unique reference number assigned to the transaction.

The central processor 40 provides to all authorized users the ability to generate custom analysis of their own data. With this approach, the carrier 22 has the ability to extract payment data needed to automatically post his accounts receivable system. Similarly, the shipper can extract payment data and automatically post his accounts payable which closes out the individual accounts payable due to each carrier. With this approach, the shipper 20 does not need a paper invoice in order to have proof of delivery. The shipper 20 accesses the central processor 40 and verifies which shipments have been delivered by a particular carrier 22. Similarly, the carrier 22 accesses the central processor 40 to find out which transactions have been paid out by the shipper 20. This informational system removes much uncertainty from the shipment process, which promotes more efficient use of available resources such as working capital, transportation, and personnel.

In a particular application, the central processor 40 generates standard shipment transaction summary reports and provides appropriate access to the reports by various users. These reports include a transaction inventory control report, an open aging summary report, a suspense inventory control by source report, and a suspense inventory aging summary report. The central processor 40 uses the security profiles to determine which subset of transaction records will be summarized for each user. For example, the shipper 20 has access only to that shipper's reports.

The inventory control report provides control totals of BOL numbers, merchandise value, and freight value. There are key control points including: starting inventory position, new BOL's from shippers, BOL's closed since the last report by the different methods discussed for closing BOL numbers, BOL's re-opened since the last report by manual proof of delivery override via customer service, BOL's canceled since the last report, and the ending inventory position.

The open aging summary report contains those BOL numbers that have not been delivered. In addition, the freight value and merchandise value for each shipper ID and Dock ID are supplied for distinct age groups. The age groups include groupings by consecutive days since the shipping date and one group for 10 days past the shipping date. The suspense inventory control by source report includes merchandise and freight value amounts of transactions in the suspense file. Several control points for the suspense inventory control include: starting inventory position, new inventory added since last report, inventory cleared since last report, inventory deleted since last report, inventory undeleted since last report, and ending inventory position. The suspense inventory aging summary report provides an aged summary of suspense files including the merchandise and freight value of items that are in the suspense file by original receipt date.

The central processor 40 generates detailed reports including: the inventory aging detail report, the suspense inventory aging detail report, and the declined item aging detail report. The detail reports are viewed by either the shipper ID/Dock ID/account ID combination or by the carrier ID/merchant number combination. The inventory aging detail report lists the open BOL numbers sorted by the days in inventory, the shipper ID combination, and the BOL number. The inventory detail report lists the merchandise and freight value associated with each open BOL number. The suspense inventory aging detail report lists open BOL numbers by source and receipt date. Several fields are displayed including: shipper ID, dock ID, account ID, BOL number, carrier ID, freight value, and the merchandise value. The declined item aging detail report allows users to research the cause of exception items and lists the shipper ID combination, ship date, authorization time, BOL number, shipper invoice number, merchant number, and freight value. The declined item aging detail report is viewed by either shipper ID/dock ID/account ID combination, or by carrier ID/merchant number combination.

The central processor 40 generates two reports that reference declined authorizations. These reports include the declined item summary report and the declined item aging report. The declined item summary report summarizes information regarding the declined authorization. The declined item aging report summarizes the information regarding the declined authorization by the shipping date.

Accordingly, the present invention provides, among other aspects, a computer processing system for a shipment transaction involving parties to a transaction, such as a shipper and a carrier or a buyer and a seller. While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A transaction-processing system for facilitating transactions involving merchant offerings among parties, the system comprising:
   a transaction databank having a plurality of anchor locations, each anchor location for storing a plurality of transaction-profile attributes that correspond to a transaction, wherein aspects of each transaction are characterized by transaction-based documents that are respectively provided by different parties to the transaction; and
   a computer arrangement, including a processor, configured and programmed to:
      identify, for a common transaction, at least the parties to the transaction and also attributes being carried by the respective transaction-based documents as respectively provided from the different parties to the common transaction,
      use the identified attributes to construct a plurality of transaction-profile attributes in a particular one of the anchor locations, and
      in response to another transaction-based document for the common transaction carrying the identified attributes, use the constructed transaction-profile attributes in the particular anchor location to authenticate the common transaction and to advance progress toward completion of the transaction.

2. The system of claim 1, wherein each of the parties to each common transaction has different party-identifying data and wherein the computer arrangement is further adapted to delineate the different party-identifying data in the transaction databank.

3. The system of claim 2, wherein each anchor location having constructed transaction-profile attributes corresponds to only one unique transaction.

4. The system of claim 1, wherein the anchor locations are identified by an anchor ID.

5. The system of claim 4, wherein the anchor ID includes a payment ID.

6. The system of claim 1, wherein the computer arrangement is adapted to identify user-profile attributes for each of the different parties to the common transaction and to store the user-profile attributes in the particular one of the anchor locations.

7. The system of claim 6, wherein the computer arrangement is adapted to use the user-profile attributes and the identified attributes for the common transaction to construct the plurality of transaction-profile attributes in the particular one of the anchor locations.

8. The system of claim 1, wherein the computer arrangement is adapted to present information stored in the anchor location for the common transaction to one of the parties to the common transaction in response to the one of the parties requesting at least one of the transaction-profile attributes constructed in the anchor location.

9. The system of claim 1, wherein the computer arrangement is adapted to advance progress toward completion of the transaction by generating payment authorization information as a function of the other transaction-based document, the transaction-profile attributes and user-profile attributes for parties to the transaction.

10. The system of claim 9, wherein the computer arrangement is further adapted to interface with a payment institution and to send the payment authorization information to the payment institution for use in effecting payment for the transaction.

11. A transaction system for processing transaction information related to a transaction between one of multiple parties to the transaction and another one of the parties to the transaction, the system comprising:
  a programmed central processing terminal, remotely situated relative to the different parties, for
    permitting, for each common transaction, the parties to review progress toward completion of the transaction;
    storing and providing data for at least one contract under which the parties to the transaction have agreed is a basis for the transaction,
    comparing elements of the transaction information, including the identity of at least two parties, with user profile information associated with the parties,
    automatically generating a set of common transaction information that identifies the transaction as a function of the comparison, the common transaction information including different user profile information from the one and the other one of the parties, and
    authenticating the transaction using the generated transaction identification information and using a set of data that includes the identities of the two parties.

12. The system of claim 11, wherein the processing terminal is further adapted to:
  use the generated set of common transaction information and automatically associate transaction information from different parties to the transaction;
  reconcile the automatically associated transaction information by comparing element values in automatically associated transaction information from different parties; and
  authorize payment for the transaction as a function of the reconciliation.

13. A method for facilitating transactions involving merchant offerings among parties including shippers and carriers, aspects of each transaction being characterized by transaction-based documents that are respectively provided by different parties to the transaction, the method comprising:
  identifying attributes for a common transaction, the identified attributes being carried by the respective transaction-based documents as respectively provided from the different parties to the common transaction,
  using the identified attributes to construct a plurality of transaction-profile attributes in a particular one of a plurality of anchor storage locations, and
  in response to another transaction-based document for the common transaction carrying the identified attributes, using the constructed transaction-profile attributes in the particular anchor location to advance progress toward completion of the transaction, while permitting the parties for the common transaction to review said progress.

14. The method of claim 13, wherein using the constructed transaction-profile attributes in the particular anchor location to advance progress toward completion of the transaction includes using the constructed transaction-profile attributes to authenticate a transaction for authorizing payment for the transaction.

* * * * *